United States Patent [19]

Owen

[11] Patent Number: 5,229,977
[45] Date of Patent: Jul. 20, 1993

[54] DIRECTIONAL UNDERWATER ACOUSTIC PULSE SOURCE

[75] Inventor: Thomas E. Owen, Helotes, Tex.

[73] Assignee: Southwest Research Institute, San Antonio, Tex.

[21] Appl. No.: 900,171

[22] Filed: Jun. 17, 1992

[51] Int. Cl.$^5$ .......................... G01V 1/06; G01V 1/38
[52] U.S. Cl. ..................... 367/145; 181/117; 181/118
[58] Field of Search ............... 367/145; 181/116, 117, 181/118

[56] References Cited

U.S. PATENT DOCUMENTS

| | | | |
|---|---|---|---|
| 1,500,243 | 7/1924 | Hammond | 181/118 |
| 2,679,205 | 5/1954 | Piety | 181/118 |
| 3,099,813 | 7/1963 | Anderson | 181/118 |
| 3,380,551 | 4/1968 | Lang | 181/118 |
| 3,563,334 | 2/1971 | McCarter | 181/118 |
| 3,587,775 | 6/1971 | Becker | 181/118 |
| 3,620,327 | 11/1971 | Savit | 181/118 |
| 3,658,149 | 4/1972 | Neal et al. | 181/118 |
| 3,669,213 | 6/1972 | Mollere | 181/118 |
| 3,700,066 | 10/1972 | Knight et al. | 181/118 |
| 3,895,688 | 7/1975 | Bouyoucos | 181/117 |
| 4,300,653 | 11/1981 | Cao et al. | 367/144 |
| 4,599,712 | 6/1986 | Chelminski | 367/144 |
| 5,013,418 | 5/1991 | Wullenweber et al. | 204/253 |

FOREIGN PATENT DOCUMENTS 554517 4/1977 U.S.S.R. .
681399 8/1979 U.S.S.R. .

Primary Examiner—J. Woodrow Eldred
Attorney, Agent, or Firm—Gunn, Lee & Miller

[57] ABSTRACT

A closed-cycle combustion low-frequency acoustic pulse source for use underwater. An elongated combustion chamber, having a first end and a second end and an elongated elastic sleeve, is filled with a stoichiometric mixture of oxygen and hydrogen from an electrolyzer. When the mixture is ignited at the first end of the chamber, a longitudinally traveling flame front is initiated at the first end of the chamber. The moving front results in a traveling thermal pressure pulse. The pressure pulse is communicated to the surrounding underwater medium producing a generally uni-directional acoustic pressure pulse along the longitudinal axis of the elongated chamber. An alternative embodiment utilizes an array of sources disposed along the generally horizontal longitudinal axis of the array.

7 Claims, 3 Drawing Sheets

DIRECTIONAL UNDERWATER ACOUSTIC PULSE SOURCE

BACKGROUND OF THE INVENTION

The present invention relates to an apparatus for and the use of a closed-cycle chemical combustion process as the means for producing accurately controlled and repeatable high-power, low-frequency, underwater sound pulses.

In general, the most effective low-frequency ocean acoustic source techniques have been non-reciprocal methods deriving their excitation energy from chemical forms (solid explosives; gas combustion), pneumatic forms (air gun), hydraulic forms (water gun; hydrodynamic), mechanical vibrators (electrical; hydraulic drive), motor-driven hammer/acoustic diaphragms, electrical discharge forms (sparkers, boomers), and cavity implosion devices. The most thoroughly exploited of these technologies are pneumatic and hydraulic sources (for off-shore seismic exploration) and the electrical discharge forms (for off-shore sub-bottom profiling and shallow marine exploration). The electric arc discharge technique had recently been refined to provide higher energy density together with the important ability to generate efficient controlled-spectrum pulses in the frequency range of about 200–2,000 Hz at input energy levels of about 1,200 Joules per pulse. With appropriate further development, this technique offers the prospect for becoming a low-maintenance ocean acoustic pulse source capable of generating accurately timed acoustic pulse signals at lower frequencies and having an input energy level up to about 10,000 Joules per pulse. However, with a practical electrical-to-acoustical energy conversion efficiency of about 15 percent, other acoustic pulse source techniques having higher energy conversion efficiency become important alternatives, provided that they can meet the practical requirements of accurate pulse timing and accurate repetitive pulse wavelet generation.

Chemical energy sources offer the highest available energy density and, in general, because of their direct energy release in the water medium, are the most efficient in converting their chemical reaction potential energy to radiated acoustic energy. For example, large underwater explosions are estimated to transform more than 50 percent of their latent energy into the outgoing shock wave pulse; a conversion process aided by the nonlinear response effects of such a finite amplitude source mechanism. Nevertheless, such sources approach the ideal performance effectiveness since the radiation efficiency of a simple linear acoustic impulsive source is inherently limited to 50 percent. That is, half of the total source energy is stored in the incompressible near field (i.e. half of the total source energy goes into kinetic mass flow imparted to the immediately surrounding liquid medium). This stored energy may only contribute to the acoustic signal when the source motion reverses as in a bubble cavity collapse.

In contrast with the impractical nature of solid state or monopropellant liquid explosives for use as a source of high-power sonar system pulses, gaseous explosions are potentially more practical by virtue of their adjustable energy content, comparable energy conversion efficiency, pulse repeatability and timing accuracy, and safety. Several forms of flexible sleeve gas exploder devices have been used in marine seismic exploration with generally good success. These devices are typically fueled by an oxygen-propane mixture fed to the combustion chamber by one or more hoses from a remote supply source and ignited by one or more remotely-controlled spark plugs. Operation of these devices at near-surface water depths has been a major advantage in providing simple design and reliable performance. However, remote metering of the gas mixtures at depth can lead to improper gas mixture variations which result in unreliable ignition and significant differences in generated pulse energy. Use of hydrocarbon fuels also produces exhaust gases which are troublesome in sources that must operate at depth.

To circumvent this problem, several forms of oxygen-hydrogen flexible sleeve exploders have been devised for use in the ocean and in boreholes to depths of 4,000 feet and possibly deeper. The oxygen-hydrogen gas mixture used in some of these devices has been derived by electrolysis of in situ sea water whereas others used a self-contained supply of aqueous electrolyte. By this electrolysis method, the generated oxygen and hydrogen mixture is produced in approximately stoichiometric balance independent of the pressure and depth conditions, resulting in more accurate ignition, combustion energy uniformity, and acoustic pulse repeatability. Combustion energy reactions up to about 200 kJoules per pulse appear to be practical for typical sonar transducer depths and pulse repetition rates in the range of about one pulse per minute, or less frequent. Combustion reaction of a stoichiometric mixture of oxygen and hydrogen forms steam as the sole combustion product which, upon condensation, will return as water to the electrolyzer to be reused in a closed-cycle repetitive gas generation and combustion process. By selecting the aqueous electrolyte which produces the lowest practical amount of chemically irreversible by-products in the closed-cycle oxygen-hydrogen electrolysis process (i.e. the minimum excess non-combustible chemical dissociation components and the minimum corrosion contaminants from the electrolytic cell electrodes and electrolyte chamber), the oxygen-hydrogen combustion process can be made accurately repetitive and tolerant of long-term cyclic operation.

To date, none of these alternative source techniques have been found to be practical either because of cumbersome and inefficient hardware or because of their limited ability to generate the desired sound energy level at the low frequencies of interest with directional specificity.

The present invention, based upon a gas combustion source concept, provides the practical advantages of a high-energy density gas reaction, a simple and safe closed-cycle source of the necessary fuel and oxidizing gases, and associated means for achieving highly directional sound radiation based either upon the flame front velocity in the combustible gas mixture combined with the combustion chamber geometry and components or the use of separate gas combustion elements in a spatial array combined with prescribed ignition timing control.

SUMMARY OF THE INVENTION

The present apparatus and method utilizes an electrolysis process to produce a stoichiometric mixture of oxygen and hydrogen gas which when ignited burns with very high flame temperature while reacting to form steam within a closed gas-generator combustion-chamber system. During each combustion event, a substantial thermal pressure impulse is generated and coupled to the surrounding seawater medium to produce a corresponding acoustic impulse. Through this electrolytic and thermodynamic process, latent chemical energy in the reactants as high as 100–200 kJoules may be converted to sound wave energy in a chemically balanced and cyclic manner. Thus, with only the input of electrical energy to the electrolysis process, the oxygen-hydrogen combustion event occurs with negligible by-products to produce a high-energy sound pulse and the steam product of combustion condenses and is returned to the electrolytic cell for reuse.

This process, employing reactants whose combustion products need not be purged out of the combustion chamber after each cycle, is one of unusually high energy density and, in analogy with other internal combustion processes, has the potential for precise timing control. The electrical input energy governs the combustion reaction energy and, correspondingly, the associated acoustic energy. The size and physical design of the combustion chamber governs the frequency spectrum of the radiated sound wave pulse.

The intimate physical coupling and energy transfer of the combustion reaction impulses into the surrounding water medium makes this transducer technique exceptionally efficient; exceeded only by that of solid explosive detonations for the desired low frequency sound signals of interest. Accurate combustion pulse timing control allows several source modules of this type to be operated with prescribed inter-element timing in a multiple-element array to produce high energy acoustic pulses having radiation directivity and a beam steering capability.

The present invention seeks to provide acoustic source transducers capable of generating high-power underwater sound pulses having predominant spectral content in the range of about 30–300 Hz and operating with good energy conversion efficiency and accurate timing control. The low-frequency pulse spectrum is necessary in order to minimize the absorption losses along the longest practical sound propagation path while also achieving effective acoustic backscattering. Source energy conversion efficiency is important in reducing the primary power demand necessary to drive the transducer and to minimize the size and weight of the source system components. This factor combined with the ability to accurately control the pulse initiation time, allows the source system to consist of an array of high-power transducer elements which provide advantages in spatial distribution of the source energy for better compatibility with the linear energy density limit of the water medium and provide useful beam forming directivity and beam steering.

DETAILED DESCRIPTION OF THE PREFERRED EMBODIMENT

In the present invention, the closed-cycle combustion-process thermo-acoustic pulse source operates by first generating a stoichiometric mixture of oxygen and hydrogen by electrolysis of water which is then ignited to react by combustion. The combustion process generates a thermally driven transient over-pressure relative to the local ocean hydrostatic pressure to produce, via a flexible combustion chamber interface, a radiated sound pressure impulse. The gaseous reactants combine to produce water vapor which, by heat exchange with the surrounding environment, condenses to water liquid which is returned to the electrolytic cell to complete the cycle. This cyclic process takes place in a self-contained subsurface transducer module designed to accommodate the various states of the operating cycle at typical sonar system immersion pressures. This modular system is energized by electrical power transferred from the surface by an armored wireline cable which also serves as the transducer suspension cable. Ignition of the combustion pulse is provided by a high-voltage power supply and one or more spark plugs contained in the transducer module. Ignition trigger pulses are transmitted to the transducer module from a surface control unit. Source system performance monitoring data are transmitted to the surface control unit by telemetry circuits contained in the wireline cable.

Figure 1:
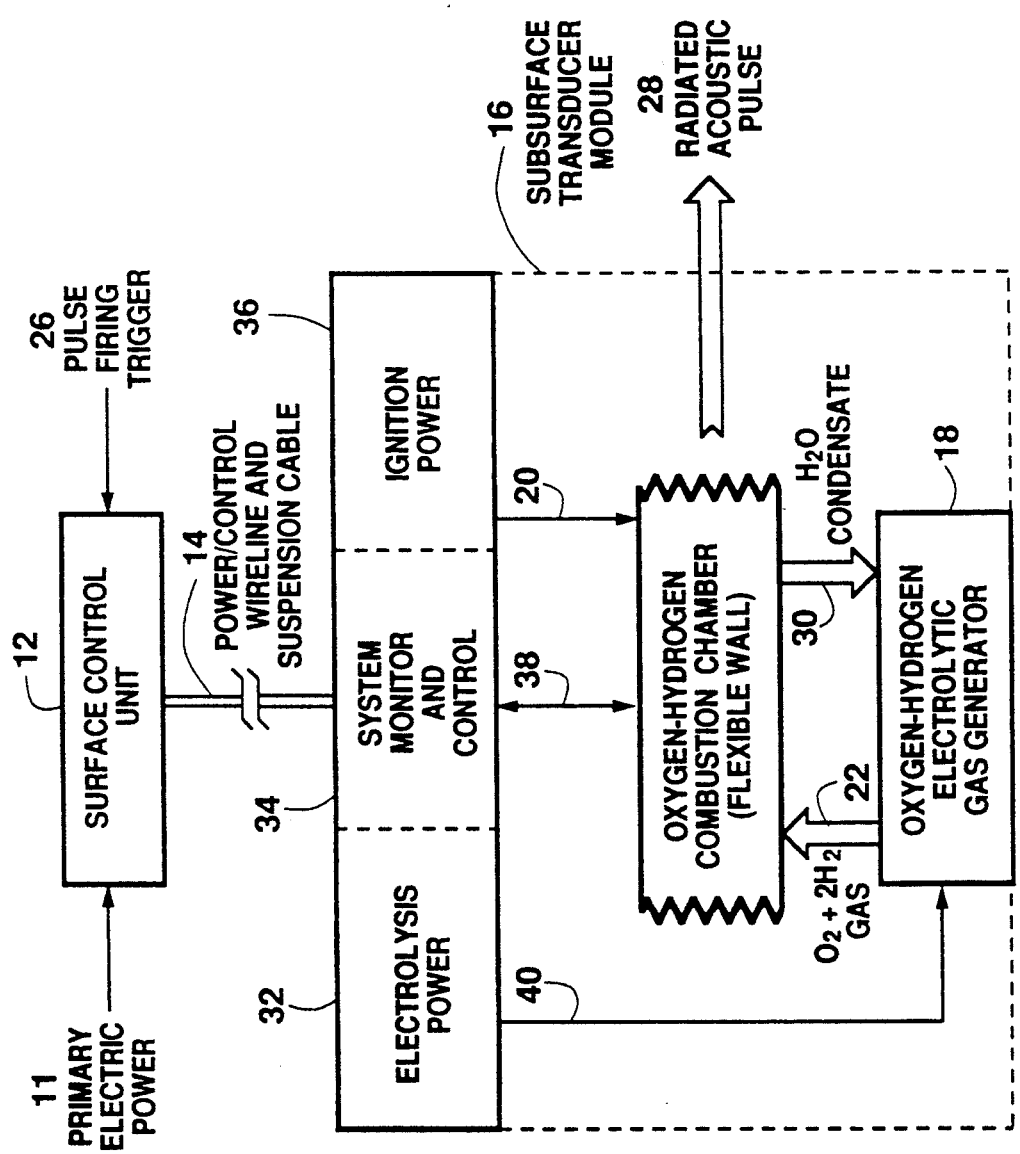
FIG. 1 illustrates the closed-cycle repetitive, acoustic pulse system in simplified block form.

FIG. 1 illustrates the closed-cycle repetitive acoustic pulse system in simplified block diagram form. In operation, primary electrical power 11 from the surface control unit 12 and wireline cable 14 is conditioned in the subsurface transducer module 16 to operate the electrolytic cell 18 and to supply a high-voltage ignition spark 20 when triggered from the surface control unit 12. The electrolytic cell or electrolyzer 18 generates an accurately stoichiometric mixture of oxygen and hydrogen gas 22 which flows into the flexible-wall combustion chamber 24 building up a chemical combustion charge whose energy content is dependent upon the effective current flow through the electrolytic cell. The gas mixture in the combustion chamber will become pressurized as the electrolysis process proceeds, acting against the hydrostatic pressure external to the chamber. [Normally, prior to operational use, the combustion chamber will be evacuated and the electrolyte degassed to remove any nonreacting gases which would otherwise moderate the combustion temperature or produce potentially contaminating by-products.]

When a firing trigger pulse 26 is transmitted to the subsurface module 16, the gas mixture in the combustion chamber 24 will be ignited and will burn rapidly to produce high-temperature steam at a substantial pressure rise proportional to the pre-combustion chamber pressure at the time of ignition. The incompressible seawater medium surrounding the combustion chamber 24 is directly subjected to the combustion pressure pulse and will transmit an acoustic pressure impulse 28 whose far field peak amplitude will depend upon the motional velocity of the combustion chamber wall. Internal steam pressure, mechanical compliance of the chamber wall, heat storage and transfer from within the chamber, and kinetic energy in the surrounding medium interact to absorb the non-acoustic residual energy of the combustion process representing the energy deficit which would otherwise allow the chemical-to-acoustic energy conversion efficiency to be 100 percent. The much slower collapse rate of the chamber, related primarily to the condensation rate of the steam, will produce a weaker and time delayed secondary acoustic pressure impulse, similar to the steam bubble collapse pulse of an underwater explosion, which will radiate into the far field as an indirect contribution to the acoustic efficiency of the source. Water 30 from the condensed steam is returned to the electrolytic cell where it is reused in the next pulse cycle.

The electrolysis process used to dissociate the aqueous electrolyte into oxygen and hydrogen is relatively inefficient because of electrical heating inherent in conducting current through the bulk liquid (gas generation results only from the half-cell reactions at the electrodes). Power losses in the electrolyte and the needed gas production rate govern the size and heat transfer capacity of the electrolyzer. For a given geometric cell design, the gas production efficiency may be optimized by adjusting the conductivity of the electrolyte solution. Dilute aqueous solutions of strong acids (e.g. sulfuric acid) or bases (e.g. sodium hydroxide) are most commonly used in oxygen-hydrogen electrolytic generators. The chemical nature of these electrolytes will govern the choice of the materials used to construct the electrolytic cell. The preferred electrode materials are the noble metals although corrosion-resistant stainless steel or certain conducting polymers well known in the art may serve as suitable alternative electrodes when used with certain electrolytes.

An electrolytic cell or electrolyzer using a sodium hydroxide aqueous electrolyte will produce a stoichiometric mixture of oxygen and hydrogen at an efficiency of about 25 percent when comparing the produced gas constituent heating value energy with the electrical energy input. A simple one-stage cell will produce $8.306 \times 10^{-5}$ g/sec of oxygen and $1.038 \times 10^{-5}$ g/sec of hydrogen per ampere of current flow. The voltage drop across an ideal (100-percent efficient) electrolytic cell is 1.277 volt neglecting any power losses in the bulk liquid electrolyte. For electrolyte concentrations which yield only the desired stoichiometric gas mixture (no other adverse electrode reactions) a typical cell voltage will be approximately 2.0 volts, taking into account the bulk liquid voltage drop. Considering the remote operating requirement of the transducer, with the wireline cable as a significant part of the electrolytic power delivery circuit, a series cascade of such cells offers a practical design approach. Thus, given a wireline cable having a specific voltage rating and conductor resistance, there will be an optimum number of electrolytic cells for maximally efficient gas production. Further, although not necessarily a constraint in low repetition rate acoustic pulse source systems, the maximum gas production energy rate will generally be limited by the wireline cable. As a preliminary design configuration, the electrolytic cell may consist of 50–100 cascaded stages operating at a series current of about 8–10 amperes supplied by a surface sending end voltage of 2–300 volts on the wireline cable. In such a case, a 100-stage cell will generate about 10 liters of hydrogen at standard temperature and pressure per minute; a useful production rate that may be increased, if necessary, by a factor of 2–4 to meet higher energy or rapid pulse repetition rate operation. The associated latent chemical energy content of a stoichiometric mixture of 10 liters of hydrogen and 5 liters of oxygen is 67,760 Joules and, in complete closed cycle operation, is determined from the lower heating value of hydrogen. An increase of about three times this energy input to the combustion process (i.e. to about 200 kJ) is anticipated to shift the system operational limitations from the wireline power handling capacity to the heat transfer design of the electrolytic cell and to the strength of materials used in the flexible sleeve combustion chamber. This limit is also estimated to be in excess of the linear acoustic energy density characteristics of the water medium except at very deep depths.

The combustion process is one of very rapid burning of the gas reactants in which typical flame front velocities are in the range of 1,000–2,000 m/sec. Thus, for well mixed gases, the combustion time duration will be in the range of about 1 msec and will produce peak temperatures in the range of about 2,500°–3,000° K. When the combustion process occurs at constant volume, then an estimate of the peak combustion overpressure is $$P_{pk} \approx (T_{max}/T_{amb})P_{amb};$$

a value corresponding to about eight to ten times the ambient immersion hydrostatic pressure of the transducer. By coupling this pressure impulse to the surrounding seawater through the flexible interface of a high-temperature-rated elastomer sleeve, the chemical reaction energy of the oxygen-hydrogen mixture is efficiently transferred to acoustic and kinetic energy in the water medium. The combustion process induces high tensile stresses in the elastomer and exposes its inner surface to high-temperature steam. Therefore, a tough high-temperature elastomer such as Kalrez (Dupont) or similar material is required and an expansion-limiting outer cage may be used to restrict the physical expansion of the sleeve. Ignition of the gas mixture may be hindered by any residual water condensate in the combustion chamber. Therefore, several independently fired spark plugs should be located within the combustion chamber and heated to prevent fouling.

The physical size and combustion energy of the transducer are factors that establish the practical physical scale and material stress limits. Combustion chamber volumes ranging from about 15 in$^3$ to 60–80 in$^3$ cover the practical range for the low-frequency high-power acoustic impulses of interest in the present invention, i.e., 30–300 Hz.

Figure 2A:
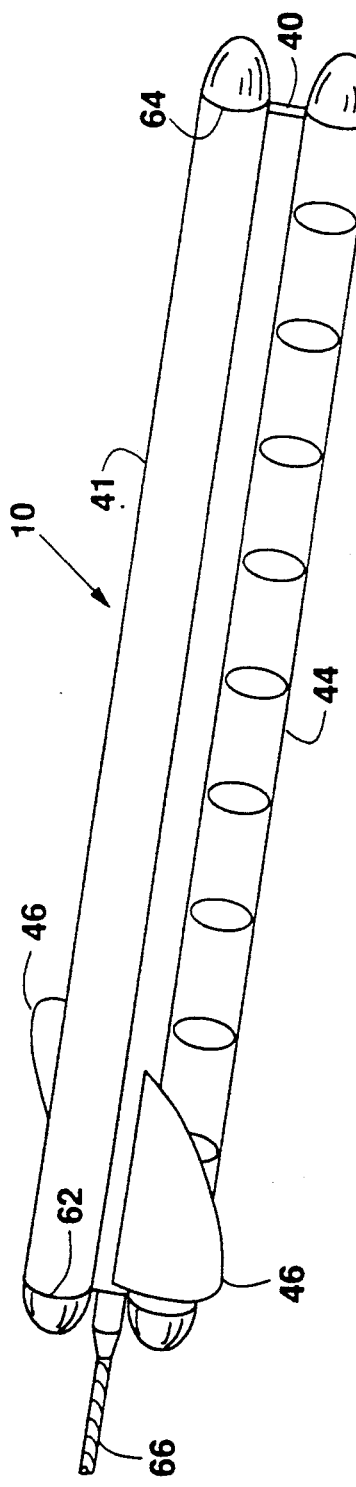
FIG. 2a illustrates a perspective view of the present invention.

FIGS. 2a, 2b, 2c and 3 illustrate towed arrays of the present invention 10 described above. In FIG. 2(a), the rectangular strut 40 along the central length of these arrays is the rigid strength member of the assembly whereas the upper 41 and lower 44 cylindrical sections form the flexible combustion chambers and the rigid electrolysis cells, respectively. Stabilizing fins 46 near the forward end maintain the array vertically oriented with the combustion sleeve 48 at the top and the electrolysis cells 50 at the bottom.

Figure 2C:
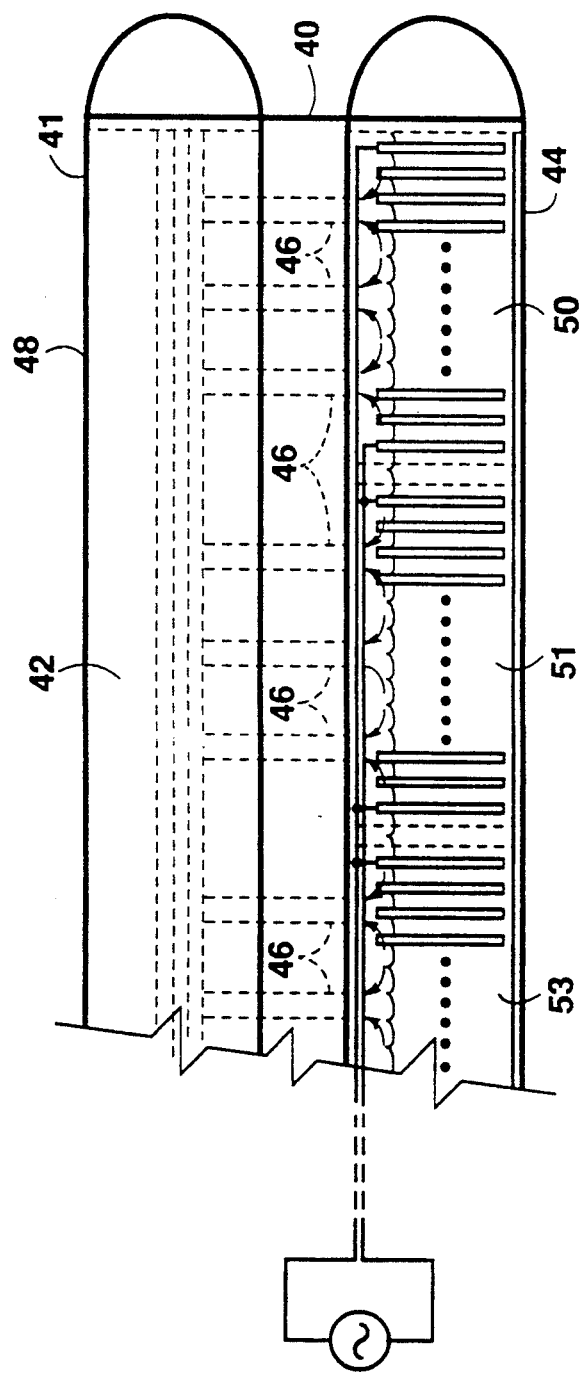
FIG. 2c illustrates a partial side cross section of the present invention.
Figure 2B:
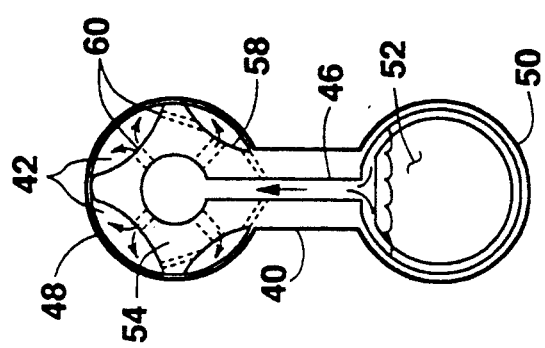
FIG. 2b illustrates an end cross-section of the present invention.

FIG. 2(b) illustrates an end cross-section of the device, showing the electrolytic cell 50 containing an aqueous electrolyte 52 at the bottom and the flexible sleeve 48 and an internal core body 54 at the top.

The internal core body may be a rigid member extending the length of the chamber. The core size may vary to determine the volume of oxygen and hydrogen which may be received in the chamber. The rectangular strut 40 provides passageways 46 for oxygen and hydrogen gas to enter or communicate with the combustion chamber 42 and to tend to inflate the sleeve 48 in the concave rib zones 58 around the internal core 54. Numerous gas passage holes 60 perforate the core to permit free movement of the gas mixture before combustion and to permit drainage of the condensed water after combustion.

FIG. 2(c) shows a side cross-section illustrating two of the adjacent electrolysis cells 50 and 51 and their parallel electrical connections. The cascade of multielectrodes in each electrolysis cell consists of 50–100 electrode plates designed to operate at 100–200 volts applied at each end; the ends being electrically connected at common voltage polarities to force proper current flow through each cell. The evolved oxygen and hydrogen are mingled directly upon liberation and rise upward through narrow passageways 46 in the strength member strut 40 to enter the combustion chamber 42. In the continuous combustion chamber shown, the combustion process is initiated at the forward end 62 of the chamber and the resulting combustion pulse travels at the flame-front velocity to the aft end 64 of the chamber. The sound wave impulse generated in the surrounding seawater is directed aft of the towed array. The shape and perforated characteristics of the internal core 54 within the flexible sleeve 48 is designed to influence and adjust the oxygen-hydrogen flame-front velocity to be approximately equal to the velocity of sound in sea water at the typical depth intended for the source transducer operation. Operating power and ignition control signals are supplied from the surface vessel via the towing cable 66.

The directional underwater acoustic pulse source 10 has the following:

(1) High impulsive sound energy created by the combustion reaction of stoichiometrically mixed oxygen and hydrogen.

(2) Closed-cycle combustion operation involving cycle steps wherein water is first decomposed by electrolysis to produce oxygen and hydrogen in stoichiometric proportions, the oxygen and hydrogen mixture is next ignited to cause a rapid impulsive chemical reaction and associated thermal expansion process in which the only combustion by-product is steam, and finally the steam cools and condenses to water which is returned to the electrolysis process for reuse.

(3) The combustion chamber in which the oxygen and hydrogen gases react is a flexible sleeve through which the impulsive pressure associated with the heat of combustion imparts a pressure into the surrounding medium (sea water) to produce an impulsive shock wave or sound wave having an acoustic energy level which is a substantial fraction of the chemical energy of the reactant gases.

(4) The flexible-sleeve combustion chamber consists, in a first form, of a tubular elastomer channel in which combustion of the contained reactant gases is initiated at a first end, the resulting combustion process travels along the sleeve toward the second end at a flame-front velocity which is dependent upon the combustion gas constituents, their ambient conditions, and the sleeve geometry, whereafter the combustion cycle ends when the flame front reaches the second end of the flexible sleeve. Thermal expansion of the reacting gases forms a traveling pressure front in the flexible sleeve, pressurizing and expanding the sleeve outwardly against the surrounding seawater medium and, thereby, progressively generating generally uni-directional acoustic sound waves in the water along the length of the sleeve. The flexible sleeve geometry causes the combustion flame-front velocity to be approximately the same as the speed of sound in the surrounding sea water medium; part of the combustion pressure pulse energy efficiently transformed into a radiated sound wave. The combustion pressure pulse, traveling at the speed of sound in sea water along the length of the flexible sleeve, acts in a constructive way to inherently reinforce the waterborne sound wave traveling in the direction of the combustion pulse. This process discriminates against soundwaves radiated in the direction opposite to that of the traveling combustion pulse, resulting in a one-dimensional line radiator having a preferential "end-fire" sound radiation pattern along the longitudinal sleeve axis in the direction of the traveling combustion pulse.

Figure 3:
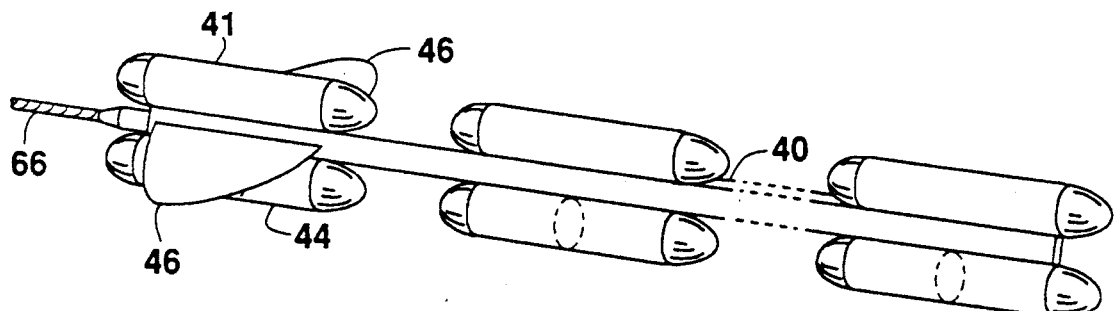
FIG. 3 illustrates an alternate embodiment of the present invention having an array of separate combustion chambers.

(5) The flexible-sleeve combustion transducer may consist, in an alternate embodiment as shown in FIG. 3, of an array of separate combustion compartments or modules, fed either from a common electrolytic gas generator or from individual electrolytic gas generators, and having independent ignition circuits and ignition timing control. By placing these modular elements in a prescribed spatial array relationship, and controlling their pulse ignition times in prescribed relationships, the array can produce desirable sound radiation patterns which may be adjusted in beamwidth and direction. For example, when such a modular array containing a number of closely spaced elements is arranged in a straight line and the modules triggered at delayed ignition times beginning at a first end and ending at an opposite end, then a discrete-element array similar to the continuous-sleeve concept described is obtained. Efficient end-fire sound radiation is obtained from this discrete-element array when the ignition delay times between adjacent elements are the same as the sound pulse travel time in the surrounding sea water as governed by the spacing distances between the adjacent elements and the speed of sound in the sea water.

Figure 4A:
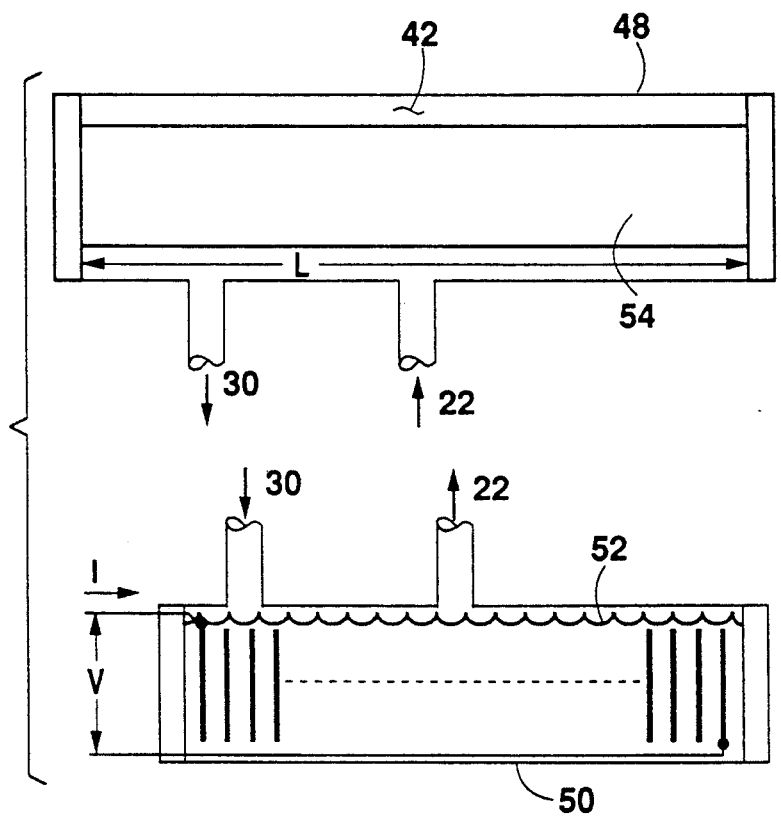
FIGS. 4A and 4B illustrate a simplified view of the annular cylindrical combustion chamber configuration.
Figure 4B:
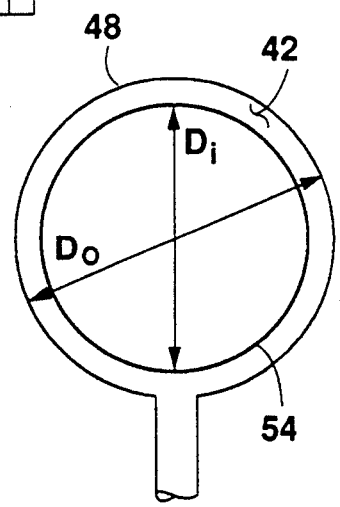

FIGS. 4a and 4b illustrate a simplified physical layout of the annular cylindrical combustion chamber configuration. The rigid center body 54 of the combustion chamber 42 is employed to increase the surface area of the active surface of the source and to provide control of the volume displacement of the source independent of the combustion chamber volume. The design parameters of the pulse source of FIGS. 4a and 4b are as follows:

| Preliminary Design of a Oxygen-Hydrogen Combustion Pulse Source | |
|---|---|
| Number of electrolysis Cells: | 75 |
| Length of Combustion Chamber | 1.0 m |
| Annular Volume of Combustion Chamber: | $3.14 \text{ l} = 3.14 \times 10^{-3} \text{ m}^3$ |
| | $D_o = 0.254$ m |
| | $D_i = 0.246$ m. |
| Applied Voltage (75 cells) | 97.5 V (rms) (neglecting electrolyte voltage drop) |
| Current in 75-Cell Cascade: | 10 A (rms) |
| Operating Power: | 975 W. |
| Charging time to store 236 kJ latent energy: | 240 sec (4 min) |
| Peak Combustion Impulse Pressure: | $9.786 \times 10^6$ Pa (1,419 psig) (At depth of 100 m in seawater $P_{100} = 1.0074 \times 10^6$ Pa) |

The combustion chemical-to-electrical energy conversion efficiency, for the conditions carried through this analysis, is $$\text{Eff} = \frac{E_{H2}}{E_{elect}} = \frac{232.65 \text{kJ} \times 100}{975(240)\text{w} - \text{sec}}$$
$$= 99.42\%$$

It should be understood that this result neglects the power dissipated in the electrolyte between the plates and the fact that current can flow around the cascade of electrodes without contributing to the electrolysis process. An estimate of the practical energy conversion efficiency is derived on the basis that the bypass current is equal to the electrolysis current and the cell voltage drop is three times that required for electrolysis (i.e. $3 \times 1.3 = 3.9$ V where 1.3 V is the half-cell voltage drop at each electrode surface). Thus, the resistances in the electrolysis current path ($R_e$) and in the bypass current path ($R_b$) are $$R_e = \frac{3V_e - V_e}{I}$$
$$= \frac{3(1.3) - 1.3}{10} = 0.26 \text{ ohm}$$
$$R_b = \frac{3V_e}{I} = \frac{3(1.3)}{10} = 0.39 \text{ ohm}.$$

Therefore, for a gas generating current of I = 10 A, the nonproductive power loss in the electrolyte (per cell) is $$P_e = I^2 R_e + I^2 R_b$$
$$= 10^2(0.26) + 10^2(0.39)$$
$$= 26 + 39 = 65 \text{ watts/cell}.$$

Therefore, the approximate electro-chemical energy conversion efficiency, for a gas producing power of $P_g = 1.3 \times 10 = 13$ w, is $$\text{Eff} = \frac{P_g}{P_g + P_e} \times 100$$
$$= \frac{13}{13 + 65} = 16.7 \text{ percent}$$

based upon a single-cell model with bypass current.

As a projection of the typical limit of improvement in this efficiency, if no bypass current existed the electrolyte losses would be reduced from 65 watts to 26 watts and the resulting efficiency would be $$\text{Eff}|_{I_b=0} = \frac{13}{13 + 26} = 33.2 \text{ percent}.$$

For a 75-cell cascade electrolyzer, the excitation voltage required for operation in the case involving electrolyte losses is $$V_{ex} = 75(3V_e)$$
$$= 292.5 \text{ V (rms)}$$

and, for a total electrolyzer current of $I_T = I + I_b = 20$ A (rms), the excitation power to the 75-cell electrolyzer operating at 100 percent duty cycle (one combustion pulse every four minutes) is $$P_{ex} = V_{ex} I_T$$
$$= 5,850 \text{ watts}$$

at 16.7 percent electro-chemical conversion efficiency.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A closed-cycle combustion acoustic pulse source for use underwater comprising:
   An elongated combustion chamber having a first end and a second end and an elastic outer sleeve extending the length of said chamber;
   a means for igniting, at said first end of said combustion chamber, a stoichiometric mixture of oxygen and hydrogen contained in said chamber to initiate a flame front which travels from said first end of said chamber to said second end of said chamber creating a traveling thermal pressure pulse, said thermal pressure pulse in turn generating a generally uni-directional acoustic pressure pulse in said underwater along the longitudinal axis of said elongated chamber, said chamber further comprises an elongated core member cooperating with said elastic sleeve to provide an annular combustion zone to receive a sufficient volume of said mixture of oxygen and hydrogen to produce a preferred frequency of said acoustic pressure pulse when said volume is ignited;
   an elongated electrolyzer containing an aqueous electrolyte for producing said mixture of oxygen and hydrogen upon activation of an electrolysis power source;
   a means for delivering said mixture of oxygen and hydrogen to said combustion chamber prior to ignition of said mixture and for delivering condensate to said electrolyzer after ignition of said mixture.

2. The source of claim 1 wherein said preferred frequency is in the 30-300 Hz range.

3. The source of claim 1 wherein said electrolyzer further comprises a plurality of electrolysis cells along a central length of said electrolyzer.

4. The source of claim 1 wherein said combustion chamber and said electrolyzer are positioned in said underwater with said longitudinal axis of said chamber in a generally horizontal orientation, said electrolyzer positioned beneath said chamber.

5. The source of claim 1 wherein said means for delivering said mixture of oxygen and hydrogen to said combustion chamber prior to ignition of said mixture and for delivering condensate to said electrolyzer after ignition of said mixture comprising a strut connected to and extending along the length of said chamber and said electrolyzer, said strut having a multiplicity of gas, and condensate passageways communicating said electrolyzer to said chamber.

6. A method for generating a generally uni-directional acoustic pressure pulse in an underwater environment comprising:
   producing in an electrolyzer a stoichiometric mixture of oxygen and hydrogen;

delivering said mixture to an elongated combustion chamber having a first end and a second end and an elastic outer sleeve extending the length of said chamber;

igniting said mixture at said first end of said chamber to initiate a flame front which travels from said first end of said chamber to said second end of said chamber creating a traveling thermal pressure pulse, said thermal pressure pulse in turn generating said generally uni-directional acoustic pressure pulse in said underwater environment wherein the frequency of said acoustic pressure pulse is determined by varying the volume of said delivered mixture in said chamber by varying the volume of a core element positioned within said chamber, said acoustic pulse traveling in the direction of said length of said chamber;

collecting condensated steam after said igniting for delivery to said electrolyzer.

7. The method of claim 6 wherein said frequency is in the range of 30-300 Hz.

* * * * *